(12) United States Patent
Baranowski et al.

(10) Patent No.: US 10,987,781 B2
(45) Date of Patent: Apr. 27, 2021

(54) CLAMPING DEVICE FOR CLAMPING AT LEAST TWO COMPONENTS TO BE JOINED TOGETHER AND A METHOD FOR DESIGNING THE SAME

(71) Applicant: Ford Global Technologies, LLC, Dearborn, MI (US)

(72) Inventors: Thomas Baranowski, Wurselen (DE); Lars Bognar, Dormagen (DE); Maik Broda, Wurselen (DE); Maximilian Engelke, Aachen (DE); Marcel Mathissen, Wurselen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 235 days.

(21) Appl. No.: 16/253,319

(22) Filed: Jan. 22, 2019

(65) Prior Publication Data
US 2019/0224816 A1    Jul. 25, 2019

(30) Foreign Application Priority Data

Jan. 22, 2018    (DE) .......................... 102018200941.4

(51) Int. Cl.
    *B25B 5/00*         (2006.01)
    *B23P 19/10*       (2006.01)
             (Continued)

(52) U.S. Cl.
    CPC .............. *B25B 5/003* (2013.01); *B23K 37/04* (2013.01); *B23P 19/10* (2013.01); *B25B 11/00* (2013.01)

(58) Field of Classification Search
CPC ................ B23K 37/04; B23K 37/0408; B23K 37/0435; B23K 37/0443; B23P 19/10; B23Q 3/062; B23Q 3/063; B23Q 3/064; B23Q 3/066; B23Q 3/069; B23Q 3/18; B23Q 3/183; B23Q 3/186; B25B 11/00; B25B 11/02; B25B 27/00; B25B 27/02; B25B 5/003; B25B 5/145
See application file for complete search history.

(56) References Cited

U.S. PATENT DOCUMENTS 5,343,611 A    9/1994   Lager et al.
5,907,489 A    5/1999   Elliott
              (Continued)

FOREIGN PATENT DOCUMENTS

DE        102013004490       9/2014

OTHER PUBLICATIONS

Chae, S., et al., An Optimal Design System for Spot Welding Locations, (Abstract), Finite Elements in Analysis and Design, vol. 38, Iss. 3, pp. 277-294, 2002, Elsevier Science B.V.

*Primary Examiner* — Tyrone V Hall, Jr.
(74) *Attorney, Agent, or Firm* — Burris Law, PLLC

(57) ABSTRACT

A clamping device for clamping at least two components which are to be joined together includes a first carrier structure, a second carrier structure which is connectable to the first carrier structure by a connector, and at least one positioning device which is provided on the first or the second carrier structure in order to position the components to be joined together at a defined position with reference to the first or the second carrier structure. A method for designing a clamping device for clamping at least two components to be joined together includes steps for designing these various elements.

16 Claims, 4 Drawing Sheets

(51) Int. Cl.
*B25B 11/00* (2006.01)
*B23K 37/04* (2006.01)

(56) References Cited

U.S. PATENT DOCUMENTS

| | | |
|---|---|---|
| 6,378,186 B1 | 4/2002 | Angel |
| 6,918,577 B2 | 7/2005 | Ghuman et al. |
| 2005/0218576 A1* | 10/2005 | Yajima ............... B23K 37/0443 269/32 |

* cited by examiner

CLAMPING DEVICE FOR CLAMPING AT LEAST TWO COMPONENTS TO BE JOINED TOGETHER AND A METHOD FOR DESIGNING THE SAME

CROSS-REFERENCE TO RELATED APPLICATIONS

This application claims priority to and the benefit of German Application No. 102018200941.4, filed on Jan. 22, 2018. The disclosure of the above application is incorporated herein by reference.

FIELD

The present disclosure relates to a clamping device for clamping at least two components which are to be joined together.

BACKGROUND

The statements in this section merely provide background information related to the present disclosure and may not constitute prior art.

DE 10 2013 004 490 A1 discloses a clamping device for clamping at least two components which are to be joined together as well as a method, the clamping device comprising a first carrier structure. The single-part clamping device is realized in frame design and serves for positioning and clamping a body part in a body part joining system. The single-part clamping device has frame elements which have interfaces to functional elements for holding, positioning and clamping the component in a predefined position. The topology has been optimized to the effect that the frame elements comprise a profile cross section, the profile course of which is adapted in a weight-saving manner to the force lines acting on the assembly site. The clamping device is not designed by means of CAD (computer aided design).

U.S. Pat. No. 5,343,611 A discloses a method and a fastening system for fastening, positioning and clamping components to be mounted as a result of welding. According to the method, drawing information for the mounted product is prepared in a computer program, a zero position is determined on the product and an installation plan for the fastening system to be constructed is provided based on the drawing information and the zero position on the product by support positions being determined on the device in a coordinate system with reference to the product. On this basis, the fastening system is constructed from predetermined standard fastening components according to the installation plan. The standard fastening components have a certain hole pattern by means of which they are able to be connected together.

U.S. Pat. No. 5,907,489 A discloses a system and a method for constructing devices for holding automobile components which are to be welded. In this case, L-shaped support elements are selected and arranged on a platform based on the contour of the part to be held, the main positioning points for the components and the geometry of the various L-shaped support elements.

U.S. Pat. No. 6,378,186 A discloses a frame system for assembling and welding a carcass. The frame system uses completely separate framing and welding operations which are typically combined in conventional frame systems. The frame device is a one-piece frame structure, in which an underbody, side frame and other body parts can each be supported and positioned precisely with respect to one another prior to the welding operation. By using a suitable number of clamping devices, the grid-like fixing positions of the body parts are produced and maintained in a suitable manner. Multiple welding guns can be used during the welding operation.

U.S. Patent Publication No. 2004/0,056,405 A1 discloses a tool plate for fastening a workpiece of a vehicle assembly. The tool plate can be positioned in a reproducible manner by a positioning mechanism.

A clamping device according to an in-house prior art is shown in FIGS. 3A and 3B. The clamping device is a substantial component in production engineering for example for the automobile industry, the aviation industry, etc. Such clamping devices are used for quality assurance for example as measuring templates or to produce dimensionally accurate parts, for example in the form of a welding clamping device, as is shown in FIGS. 3A and 3B.

Components 001, 002, 003, 004 which are to be joined together are shown in the upper part of FIG. 3A. The lower part of FIG. 3A shows how the components 001, 002, 003, 004 which are to be joined together are positioned on the clamping device in order to be welded to one another.

The designing and producing of clamping devices are, however, time-consuming and costly. The layout of the clamping device shown in FIGS. 3A and 3B is usually determined exclusively by CAD. In addition, it is necessary for the precise positioning and the dimensions of the clamping device to be measured after production, as is shown in FIG. 3B. Consequently, a high level of weld accuracy is ensured. If deviations are established during measuring, the clamping device has to be adjusted again and measured again. This leads to a delay in the entire production chain.

In view of the prior art indicated, the clamping device for clamping at least two components which are to be joined together and the method for designing the clamping device still offer room for improvement.

SUMMARY

The present disclosure provides a clamping device for clamping at least two components which are to be joined together and a method for designing a clamping device by means of which savings can be made, on the one hand, to the time for (renewed) adjustment of the clamping device and, on the other hand, to the costs to produce the clamping device.

It must be pointed out that the features and measures specified individually in the following description can be combined together in an arbitrary, technically sensible manner and can demonstrate further designs of the present disclosure. The description characterizes and specifies the present disclosure additionally in particular in conjunction with the figures.

The clamping device according to the present disclosure for clamping at least two components which are to be joined together has a first carrier structure and a second carrier structure which is connectable to the first carrier structure by a connector. In addition, the clamping device has at least one positioning device which is provided on the first or the second carrier structure in order to position the components to be joined together at a defined position with reference to the first or the second carrier structure. The clamping device, which is suitable for welding steel parts, has a completely new and improved topology, by means of which savings are able to be made, on the one hand, to the time for (renewed) adjustment of the clamping device and, on the other hand, to the costs for producing the clamping device.

In an advantageous manner, the positioning devices and the component guides are not mounted on the carrier structures in a movable manner and can be mounted on the carrier structures, in fact, in a rigid manner. As a result of the two-part, separate realization of the first and of the second carrier structures, the components to be joined together can nevertheless be positioned simply in the carrier structure. The tool guides can also be mounted in a rigid manner on the carrier structures.

In the connected state, the first and the second carrier structures form a closed frame in which the components to be joined together are to be clamped. As a result, the components which are to be joined together can be positioned and clamped at the same time.

The first and the second carrier structures are connected together by a joint so that the process for positioning and clamping the components which are to be joined together is simplified. In addition, the alignment of the first and the second carrier structures with respect to one another can be improved. The clamping device has a guiding and positioning element for aligning the first carrier structure to the second carrier structure, as a result of which the alignment is able to be further improved.

The clamping device has a component guide which is provided on the first or the second carrier structure in order to guide one of the components to be joined together to a defined position with reference to the first or the second carrier structure. The positioning of the components to be joined together can be further improved as a result.

The clamping device has a tool guide which is provided on the first or the second carrier structure in order to guide a tool to a defined position with reference to the first or the second carrier structure or along a predetermined movement path. The fastening or welding of the components to be joined together, on the one hand, can be simplified, accelerated and realized in a more dimensionally accurate manner with the guide tool. The clamping device has a marking for weld points on the first or the second carrier structure, as a result of which the fastening or welding of the components to be joined together is able to be further simplified.

The clamping device has a movable or rotatable element on the first carrier structure, the second carrier structure or the positioning device, which is configured for the purpose of moving into engagement with an undercut of one of the components to be joined together. This makes it possible to clamp components which are to be joined together with undercut in the clamping device.

The carrier structures and the hinge and the guiding and positioning elements can be realized from metal, from light metal such as, for example, aluminum or from plastics material. The carrier structures and the hinge and the guiding and positioning elements can be realized from the same material and in the same production process.

The method according to the present disclosure for designing a clamping device for clamping at least two components which are to be joined together has at least the following steps: acquiring coordinates of fastening or welding points for the mutual fastening or welding of the components which are to be joined together; acquiring coordinates of fixing points at which the components to be joined together are to be positioned by a positioning device in each case at defined positions; defining an available space for guiding a fastening or welding tool to a defined position or along a predetermined movement path on the basis of the acquired coordinates of the fastening or welding points; designing a first carrier structure and a second carrier structure on the basis of the available space for guiding the fastening or welding tool; and designing the positioning device which is to be provided on the first or the second carrier structure, on the basis of the acquired coordinates of the fixing points.

The method can be realized by CAD. As a result of the method, savings are able to be made, on the one hand, to the time for (renewed) adjustment of the clamping device and, on the other hand, to the costs for producing the clamping device.

The method has at least one of the following steps: a step for designing a tool guide which is to be provided on the first or the second carrier structure in order to guide the fastening or welding tool to the defined position with reference to the first or the second carrier structure or along the predetermined movement path, on the basis of the available space for guiding the fastening or welding tool; and/or a step for designing a joint which connects the first and the second carrier structures together; a step for designing a guiding and positioning element for aligning the first carrier structure to the second carrier structure; a step for designing a component guide which is to be provided on the first or the second carrier structure in order to guide a component which is to be joined together to a defined position with reference to the first or the second carrier structure; a step for designing a marking for the fastening or welding points on the first or the second carrier structure; and a step for designing a movable or rotatable element on the first carrier structure or the second carrier structure which is designed for the purpose of moving into engagement with an undercut of one of the components to be joined together.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
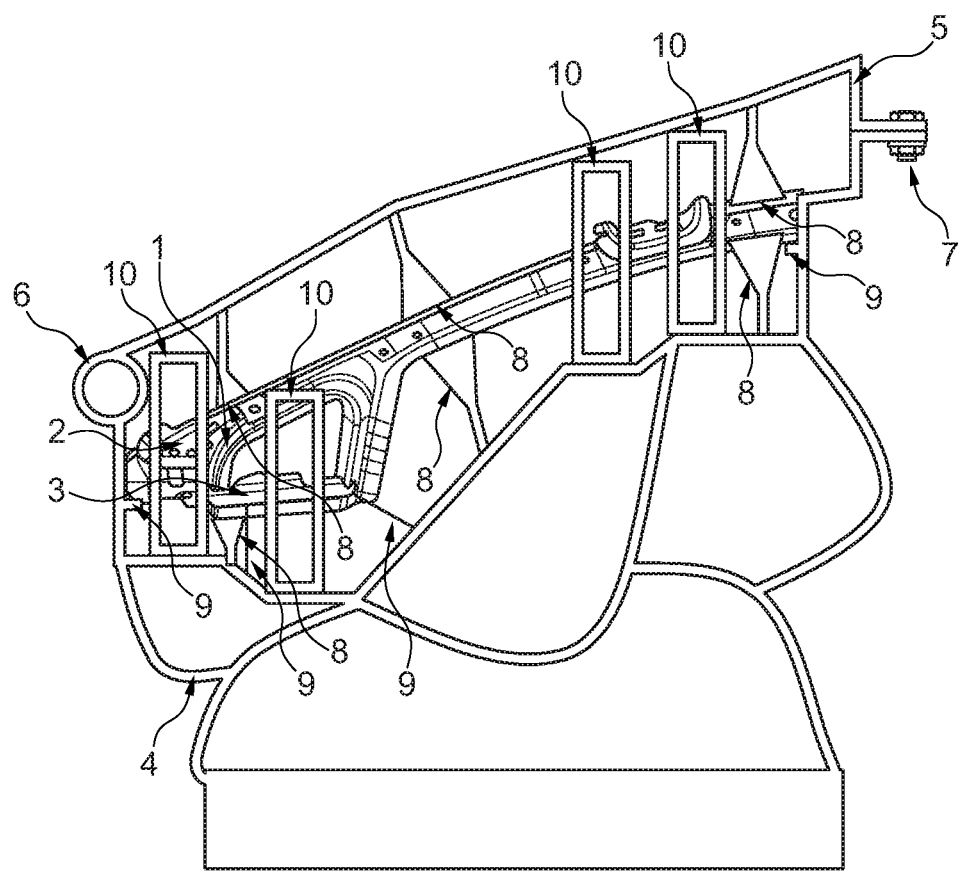
FIG. 1 shows an exemplary form of a clamping device for clamping at least two components to be joined together according to the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

FIG. 1 shows an exemplary form of a clamping device for clamping at least two components 1, 2, 3 to be joined together. The clamping device is a welding clamping device. The clamping device comprises a first carrier structure 4. The clamping device additionally comprises a second carrier structure 5 which is connectable to the first carrier structure 4 by at least one connector 6, 7. In the exemplary form shown, the connector 7 is a screw-type connection 7. However, a quick release including a clamp or a different connector can also be provided with the other connector 6 being realized as a joint 6. In the exemplary form shown, the first and the second carrier structures 4, 5 are connected together by the joint 6. The joint 6 can be realized, as shown, in one piece. As an alternative to this, a multi-part joint can be provided which has elements which are separable from one another and hook into one another. The first and the second carrier structures 4, 5, in the connected state, form substantially a closed frame in which the components 1, 2, 3 to be joined together are clamped. The clamping device has a guiding and positioning element (not shown) in order to align the first carrier structure 4 correctly to the second carrier structure 5. The guiding and positioning element can be a centering pin which is arranged on either of the two carrier structures and engages in a centering hole which is provided in the other of the two carrier structures.

The clamping device has at least one positioning device 8 which is provided on at least one of the first carrier structure 4 and the second carrier structure 5 in order to position one of the components 1, 2, 3 to be joined together at a defined position with reference to the first or the second carrier structure 4, 5. Furthermore, the clamping device has at least one component guide 9 which is provided on at least one of the first and the second carrier structure 4, 5 in order to position one of the components 1, 2, 3 to be joined together at the defined position with reference to the first or the second carrier structure 4, 5.

The clamping device has at least one tool guide 10 which is provided on at least one of the first carrier structure 4 and the second carrier structure 5 in order to guide a tool to a defined position with reference to the first or the second carrier structures 4, 5 or along a predetermined movement path. The tool guides of the exemplary form are guides for a welding gun or welding tongs. The tool can also be a soldering tool or a glue gun. In addition, markings (not shown) for welding points can be provided on the first or the second carrier structure 4, 5. The markings can also be provided for other purposes such as, for example, as a position reference, for labelling/identifying or for pattern perception.

If one of the components 1, 2, 3 which are to be joined together has an undercut which is not reachable by the carrier structures 4, 5 or positioning devices 8, a movable or rotatable element (not shown) can be provided on at least one of the first carrier structure 4, the second carrier structure 5, and on one of the positioning devices 8 which is configured for the purpose of moving into engagement with the undercut of the components 1, 2, 3 to be joined together. The movable or rotatable element, in this connection, can be designed as an arm.

Figure 2:
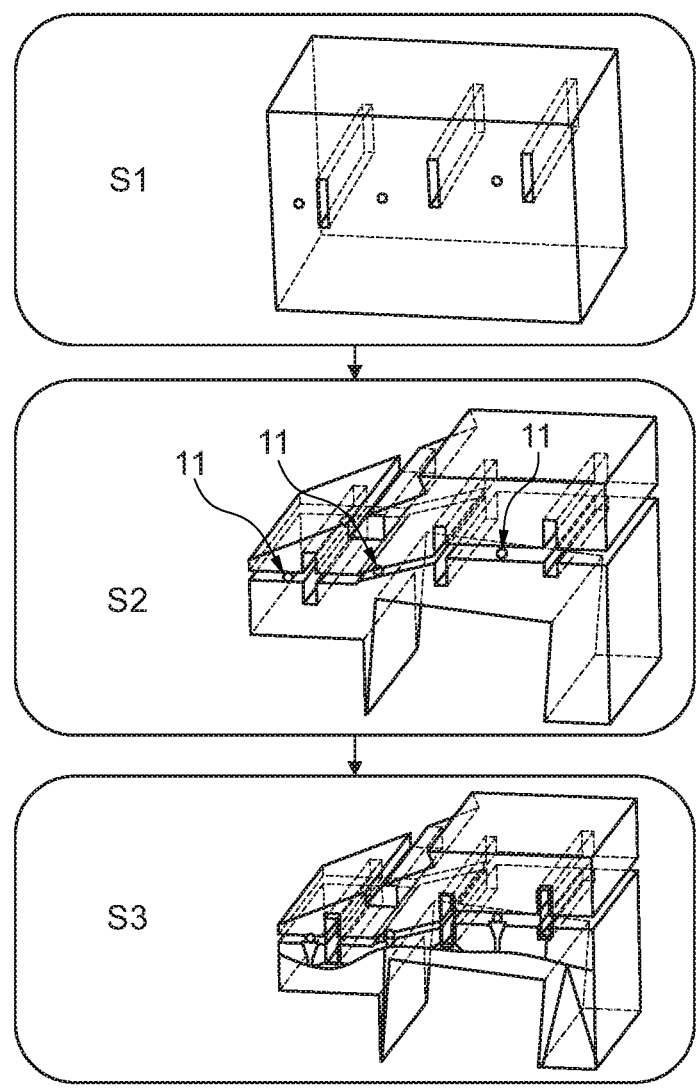
FIG. 2 shows a flow diagram of an exemplary form of a method for designing a clamping device for clamping at least two components to be joined together according to the teachings of the present disclosure.
Figure 3A:
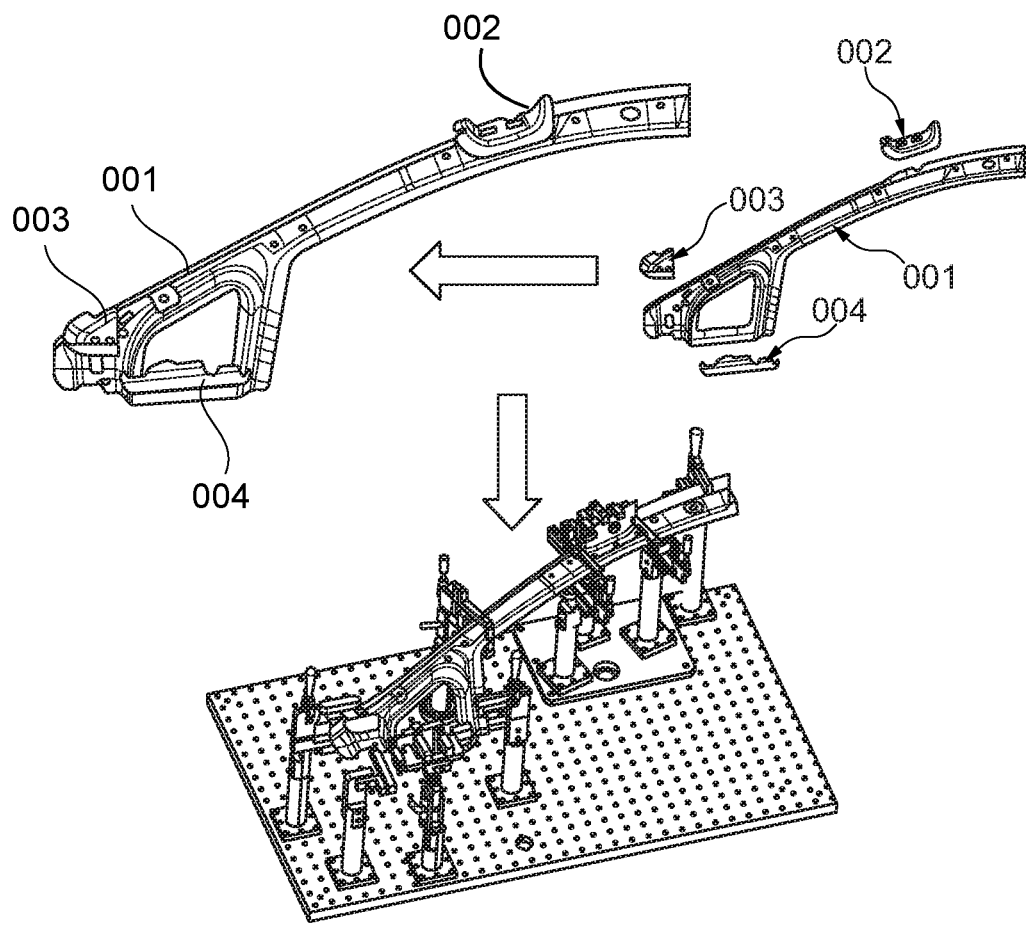
FIGS. 3A and 3B show clamping devices according to the prior art.
Figure 3B:
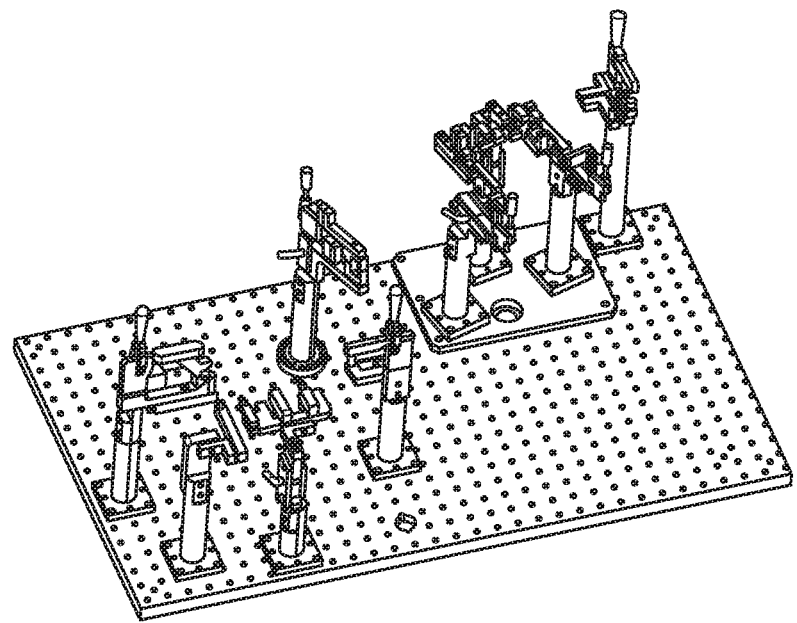
Figure 3B:
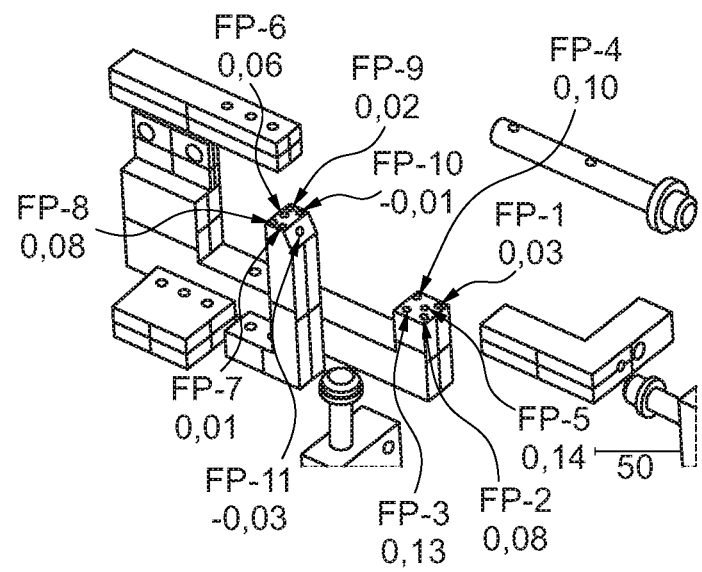

FIG. 2 shows a flow diagram of an exemplary form of a method for designing a clamping device for clamping at least two components 1, 2, 3 which are to be joined together according to the present disclosure. The designing of the clamping device, in one form, is effected by CAD (computer aided design).

Coordinates of fastening or welding points at which the components 1, 2, 3 to be joined together are to be mutually fastened or welded are acquired in a step S1. Coordinates of fixing points 11 at which the components to be joined together 1, 2, 3 are to be positioned by a positioning device 8 in each case at defined positions are acquired in a step S2.

In a step S3, on the basis of the acquired coordinates of the fastening or welding points, an available space is defined in which a fastening or welding tool is to be guided to a defined position or along a predetermined movement path. The available space is provided for the fastening or welding tool in order to fasten or weld the components 1, 2, 3 to be joined together. As an option, the acquired coordinates of the fixing points 11 can be used additionally to define the available space. If the acquired coordinates of the fixing points 11 should prove to be a hindrance to the fastening or welding tool, it is possible to acquire alternative coordinates for fixing points 11 which lie outside the available space for the fastening or welding tool. The available space can obviously also be defined by further restrictions depending on the requirement.

In the step S3, a first carrier structure 4 and a second carrier structure 5 are designed on the basis of the available space for guiding the fastening or welding tool. In the step S3, the positioning device 8, which is to be provided on the first or the second carrier structure 4, 5, is designed additionally on the basis of the acquired coordinates of the fixing points 11. As an option, the positioning device 8 can be designed additionally on the basis of the already defined, available space for guiding a fastening or welding tool.

It is conceivable to design the two carrier structures 4, 5 first of all and then the positioning device 8. The design of the positioning device 8 can then be oriented to the existing design of the carrier structures 4, 5. As an alternative to this, however, the positioning device 8 can be designed first of all and then the two carrier structures 4, 5. The design of the two carrier structures 4, 5 can then be oriented to the existing design of the positioning device 8.

Further steps can be added to the method. Depending on the requirement, the steps can be inserted or appended between the steps S1, S2 and S3 already described. In this case, this can be a step to design a tool guide 10 which is to be provided on the first or the second carrier structure 4, 5 in order to guide the fastening or welding tool to the defined position with reference to the first or the second carrier structure 4, 5 or along the predetermined movement path. The designing of the tool guide 10 is effected on the basis of the available space for guiding the fastening or welding tool. A step for designing a marking for the fastening or welding points on the first or the second carrier structure 4, 5 can additionally be added.

In addition, a step for designing a joint 6 which connects the first and the second carrier structures 4, 5 together can be added. It is also possible to add a step for designing a guiding and positioning element for aligning the first carrier structure 4 to the second carrier structure 5 and/or a step for designing a component guide 9 which is to be provided on the first or the second carrier structure 4, 5 in order to guide a component 1, 2, 3 to be joined to a defined position with reference to the first or the second carrier structure 4, 5.

Finally, a step for designing a movable or rotatable element which is to be provided on the first or the second carrier structure 4, 5 can be added. The movable or rotatable element is to be designed for the purpose of moving into engagement with an undercut of one of the components 1, 2, 3 to be joined together.

Insofar as nothing to the contrary is stated, the sequence of the above-described steps can be modified. In particular, it is conceivable to acquire the coordinates of the fixing points 11 first of all and then, based thereon, to acquire the coordinates of the fastening or welding points or to define the available space for guiding the fastening or welding tool.

Furthermore, additional intermediate steps can be added depending on the requirement.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, manufacturing technology, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A clamping device for clamping at least two components which are to be joined together, the clamping device comprising:
   a first carrier structure;
   a second carrier structure which is connectable to the first carrier structure by a connector;
   at least one positioning device provided on the first carrier structure or the second carrier structure to position one of the at least two components at a defined position with reference to the first or the second carrier structure; and
   at least one tool guide provided on at least one of the first carrier structure and the second carrier structure to guide a tool to a defined position with reference to the first or second carrier structure or along a predetermined movement path.

2. The clamping device according to claim 1, wherein in a connected state, the first and the second carrier structures form a closed frame in which the at least two components to be joined together are to be clamped.

3. The clamping device according to claim 1, wherein the first and second carrier structures are connected together by a joint.

4. The clamping device according to claim 1 further comprising a guiding and positioning element for aligning the first carrier structure to the second carrier structure.

5. The clamping device according to claim 1 further comprising at least one component guide provided on at least one of the first carrier structure and the second carrier structure to guide one of the at least two components to be joined together to a defined position with reference to the first carrier structure or the second carrier structure.

6. The clamping device according to claim 1 further comprising a marking for weld points on the first carrier structure or the second carrier structure.

7. The clamping device according to claim 1 further comprising a movable or rotatable element on the first carrier structure, the second carrier structure, or the positioning device, the movable or rotatable element configured to move into engagement with an undercut of one of the at least two components to be joined together.

8. A clamping device comprising:
   a first structure;
   a second structure connected to the first structure, wherein the first structure and the second structure form a closed frame in which components to be joined together are clamped;
   a guiding and positioning element for aligning the first structure to the second structure;
   at least one positioning device and at least one component guide disposed on at least one of the first structure and the second structure, wherein the at least one positioning device and the at least one component guide position the components to be joined together at a defined position with reference to the first structure or the second structure; and
   at least one tool guide disposed on at least one of the first structure and the second structure.

9. The clamping device according to claim 8, wherein the first and second structures are connected together by at least one of a screw and a joint.

10. The clamping device according to claim 8, wherein the at least one tool guide is configured to guide a tool to a defined position or along a predetermined movement path.

11. The clamping device according to claim 8, wherein at least one of the first structure and the second structure includes at least one marking.

12. The clamping device according to claim 8 further comprising a movable or rotatable element disposed on at least one of the first structure, the second structure, and the at least one positioning device, wherein the movable or rotatable element moves into engagement with an undercut of one of the components to be joined together.

13. A clamping device comprising:
   a first structure;
   a second structure connected to the first structure, wherein the first structure and the second structure form a closed frame in which components to be joined together are clamped;
   a guiding and positioning element for aligning the first structure to the second structure;
   at least one positioning device and at least one component guide disposed on at least one of the first structure and the second structure, wherein the at least one positioning device and the at least one component guide position the components to be joined together at a defined position with reference to the first structure or the second structure; and
   at least one tool guide disposed on at least one of the first structure and the second structure, wherein the at least one tool guide is configured to guide a tool to a defined position or along a predetermined movement path.

14. The clamping device according to claim 13, wherein the first and second structures are connected together by at least one of a screw and a joint.

15. The clamping device according to claim 13, wherein at least one of the first structure and the second structure includes at least one marking.

16. The clamping device according to claim 13 further comprising a movable or rotatable element disposed on at least one of the first structure, the second structure, and the at least one positioning device, wherein the movable or rotatable element moves into engagement with an undercut of one of the components to be joined together.

* * * * *